Jan. 4, 1966  SHIN-ICHI KAWADA  3,227,935

SERVO SYSTEM

Filed Jan. 16, 1963  2 Sheets-Sheet 1

Inventor
Shin-ichi Kawada
by
Attys.

United States Patent Office 3,227,935
Patented Jan. 4, 1966

3,227,935
SERVO SYSTEM
Shin-ichi Kawada, Meguro-ku, Tokyo, Japan, assignor to Kabushikikaisha Tokyo Keiki Seizosho (Tokyo Keiki Seizosho Co., Ltd.), Ohta-ku, Tokyo, Japan, a corporation of Japan
Filed Jan. 16, 1963, Ser. No. 251,842
Claims priority, application Japan, Jan. 20, 1962, 37/1,990
8 Claims. (Cl. 318—28)

This invention relates to a servo system, and more particularly to a relay servo system which is available for various controlling systems such, for example, as a marine automatic pilot.

One object of this invention is to provide a servo system which is simple in construction and accurate and stable in PD operations (proportional and derivative operations), PI operations (proportional and integral operations) or PID operations (proportional, integral and derivative operations).

Another object of this invention is to provide a servo system in which various kinds of motors such as an electric motor, hydraulic motor, pneumatic motor or the like can be selectively used without changing the other parts of the system to attain the above mentioned operations.

A further object of this invention is to provide a servo system in which any desired output can be obtained by only selecting a servo motor without any change of the other parts of the system.

A still further object of this invention is to provide a servo system in which the above mentioned operations can be obtained even if an input signal level is low.

Another object of this invention is to provide a servo system in which the above mentioned operations can be effected without using expensive tachometer, integrator or the like.

A further and another object of this invention is to provide a servo system which is stable in PI, PD or PID operations being operated by an electric relay or a transistor, vacuum tube controlled rectifier, thyratron gas discharge tube, magnetic amplifier or the like having a relay action which is used in the system as a relay.

Another object of this invention is to provide a marine automatic pilot which performs simply and accurately PI, PD or PID operations.

Other objects, features and advantages of this invention will become apparent from the following descriptions taken in conjunction with the accompanying drawings in which, FIGURE 1 is a block diagram of a servo system including relay operation;

Figure 1:
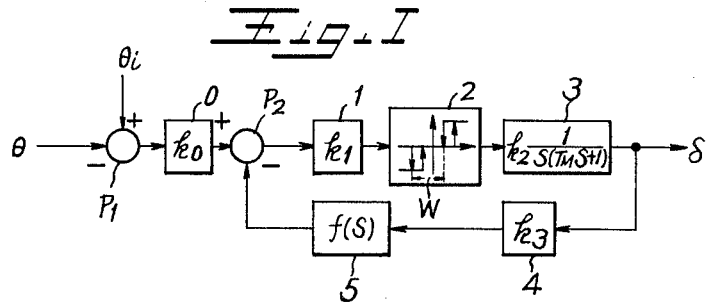

Before entering into the explanation of this invention I will explain a contact servo system. There frequently occurs in a servo mechanism, that several kinds of servo motors are required to be equipped according to objects to be controlled without changing the other parts of the servo system. For example, in a marine automatic pilot, if the gain and rate time of the automatic pilot are adjustable over some range, the PD operation can be obtained theoretically for almost all the ships. However, the output of the automatic pilot depends upon the input power level and the kind of steering engine used on the ship. Therefore, it is required to use various servo motors in the automatic pilot having different outputs. In this case, the most convenient method is to drive the servo motor through electric relays. The block diagram shown in FIGURE 1 is an example of the method usually employed. In FIGURE 1, $\theta$ is an azimuth of the ship's heading to be controlled, $\theta_i$ is a set course and 3 is a servo motor, the transfer function is approximately $$\frac{k_2}{(T_M S+1)S}$$

where S is the operator of Laplace transformation, $T_M$ is time constant of the servo motor and $k_2$ is a gain constant of the servo motor.

0, 1 and 4 are elements the gain of which are respectively $k_0$, $k_1$, and $k_3$. 2 is an electric relay having hysteresis. The quantities $\theta$ and $\theta_i$ are added at a summing point $P_1$ and converted through the element into an electric signal $k_0(\theta_i - \theta)$. 1 is an amplifier the gain of which is $k_1$ and by the output of which the relay 2 is turned on or off. 4 is a transducer the gain of which is $k_3$ for converting a mechanical angle or displacement into an electrical energy. For example, the transducer 4 consists of a gear train and a potentiometer.

In this case, 5 is an element the transfer function of which is $f(s)$. If the transfer function of the element 5 is a constant, the output of the servo system $\delta$ is proportional to $\theta_i - \theta$, as is well known. That is, provided that the gain $k_1$ of the amplifier is sufficiently large and $f(s) = 1$ in the above example, it follows that $$k_0(\theta_i - \theta) - k_3 \delta \doteq 0$$

as is apparent from the block diagram, and accordingly $$\delta = \frac{k_0}{k_3}(\theta_i - \theta)$$

Figure 2:
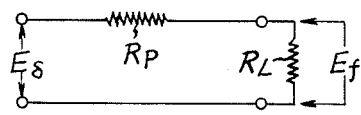
FIGURE 2 is a connection diagram showing an example of a feedback element of the servo system.

If both the signals of the input and the output are of electrical voltages, a circuit in which $f(s)$ is a constant is as shown in FIGURE 2 and $$f(s) = \frac{R_L}{R_P + R_L}$$

is obtained. $E\alpha$ is a voltage $k_3\delta$ which is in proportion to $\delta \cdot R_L$ is the impedance as seen from the output side of the element 5, that is the input impedance of the amplifier 1; $R_P$ is a resistor connected in series with the impedance $R_L$ and $E_f$ is an input voltage of the amplifier. In such a case, the servo system shown in FIGURE 1 remains stable as long as the dead zone $w$ of the relay 2 is selected to be a suitable value. In FIGURE 2 the reference sign $R_P$ or $R_L$ designating resistor or impedance is used as the corresponding value in the above equation. It will be noted that the reference sign $R_1$, $R_2$, $R_3$, $R_I$, $C$, $C_1$, $C_2$ or $C_I$ is used in the same manner in the foregoing explanation.

Figure 3:
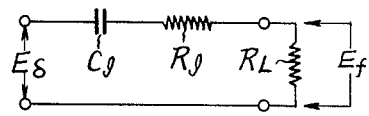
FIGURE 3 is a connection diagram showing another example of the feedback element of the servo system.

The loop of the servo system can be maintained stable even if a circuit shown in FIGURE 3 is employed as the element 5. In the circuit of FIGURE 3 a capacitor $C_I$ and a resistor $R_I$ are connected in series with the impedance $R_L$, it follows that the transfer function $$f(s) = \frac{E_f(s)}{E\alpha(s)} = \frac{R_L CS}{(R_I+R_L)CS+1}$$

and the servo system becomes more stable because the phase of the signal circulating through the loop leads more than that in the circuit of FIGURE 2. In this case, if $k_1$ is sufficiently large, $\delta$ is not only proportional to $(\theta_i - \theta)$ but also to its integrated value from the equation $$\delta = \frac{k_0}{k_3}\left\{\frac{R_I+R_L}{R_L} + \frac{1}{R_L C_I S}\right\}(\theta_i - \theta)$$

and PI operation is carried out as a whole.

Figure 4:
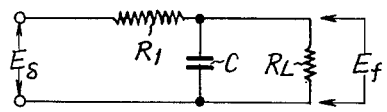
FIGURE 4 is a connection diagram showing a further example of the feedback element of the servo system.
Figure 5:
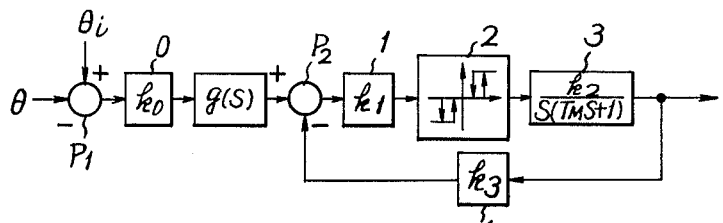
FIGURE 5 is a block diagram illustrating an example of the servo system.

The marine automatic pilot is usually required to perform the PD operation. To this end, a circuit shown in FIGURE 4 is considered for use as the element 5. In this circuit, a capacitor C is connected in parallel to the impedance $R_L$ and $$f(s) = \frac{R_L}{R_1+R_L} \cdot \frac{1}{\frac{R_1 R_L}{R_1+R_L}CL+1}$$

and it follows that $$\delta = \frac{k_0}{k_3}\left(1+\frac{R_1}{R_L}\right)\left(\frac{R_1 R_L}{R_1+R_L}CS+1\right)(\theta_i-\theta)$$

accordingly the PD operation is to be done but cannot be carried out in practice. This is due to the fact that since the circuit is a first order time lag network which is different from that in FIGURE 2 and the signal circulating through the loop is highly delayed, an oscillation of some amplitude and frequency is produced in the loop. In a marine automatic pilot heretofore employed, there have been used various methods in which a tachometer is provided in a gyrocompass which detects the azimuth of the ship's heading to obtain the turning rate $\theta$ and also in which an integration element is newly provided in pilot thereby obtaining the turning rate. In order to cause the relay servo system to carry out PID operation, there is a method such that a circuit or element having $g(s)$ of $$\left(1+\frac{1}{T_{IS}}\right), (T_{rS}+1) \text{ or } \left(T_{rS}+1+\frac{1}{T_{IS}}\right)$$

is so provided as to perform the PI, PD or PID operation at $g(s)$, as shown in FIGURE 5, and that the relay servo system succeeding thereto merely carries out the proportional operation.

However, it is very expensive to use the tachometer, the integration element or the like, and in the servo system of FIGURE 5 a signal corresponding to the $(\theta_i - \theta)$ must be of considerably high voltage in order to form a circuit having linear elements the transfer function of which is $g(s)$. Accordingly, if there is a servo system in which there is provided an element 5 having the transfer function $f(s)$ which is well adapted for a stable PD operation, such a servo system is economical and accurate in the PI, PD or PID operation even in the case of low signal level, which makes the system very practical.

Figure 6:
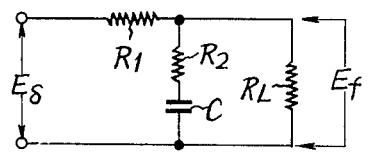
FIGURE 6 is a connection diagram showing an example of the feedback element of this invention.

This invention is intended to provide such a servo system. If a circuit shown in FIGURE 6 is used as the element 5 in FIGURE 1, it performs the PD operation and stabilizes the loop. In this circuit a series circuit consisting of a resistor $R_2$ and a capacitor connected in series therewith is connected in parallel to the impedance $R_L$. The transfer function of the circuit in FIGURE 6 is as follows:

$$f(s) = \frac{R_L}{R_1+R_L} \cdot \frac{R_2 CS+1}{\left(\frac{R_1 R_L}{R_1+R_L}+R_2\right)CS+1}$$

The difference between the above transfer function and that of the circuit shown in FIGURE 4 is that its numerator is $(R_2 CS+1)$. This implies that the phase of a signal leads with a decrease of the period and finally reaches 90° considering only the numerator, and hence it will be seen that the phase of the signal in the circuit of FIGURE 6 is not delayed for short periods as compared with that of the phase of the signal of the circuit shown in FIGURE 4 which is delayed by 90°. That is, the servo system using the circuit of FIGURE 6 as the element 5 becomes stable when $R_2 C$ is selected suitably as has been heretofore explained in connection with the circuit of FIGURE 2.

If the loop is stable, this servo system is to have the following characteristic. That is, provided that $k_1$ is sufficiently large as in the foregoing, it follows that $$\delta = \frac{k_0}{k_3}\left(1+\frac{R_1}{R_L}\right)\frac{\left(\frac{R_1 R_L}{R_1+R_L}+R_2\right)CS+1}{R_2 CS+1}(\theta_i-\theta)$$

In this case, if $$\left(\frac{R_1 R_L}{R_1+R_L}+R_2\right) \gg R_2$$

the PD operation is carried out with respect to a signal of a slightly long period which satisfies $$\omega < \frac{1}{R_2 C}$$

and it is understood that its rate time is $$\left(\frac{R_1 R_L}{R_1+R_L}+R_2\right)C$$

In general, the rate time required for a marine automatic pilot is 30 seconds or so maximum and it is appreciably large, as compared with $R_2 C$. Accordingly if $R_1$ and $R_L$ are so selected that the loop of the pilot operates stably and the rate time is 30 seconds maximum, the PD operation can sufficiently be performed to the ship and the loop of the servo system is stable.

In practice according to this invention, when $$\left(\frac{R_1 R_L}{R_1+R_L}+R_2\right)C$$

was about 25 seconds, the time constant of $R_2 C$ necessary for stabilizing the servo loop was 5.0 seconds or so. Thus, the PD operation was fully carried out within a frequency range required for the automatic pilot, and a relay servo system having a stable servo loop was obtained. As the element 5, there can be used not only the circuit in FIGURE 6 but also many other ones so that the loop is stable and the PD operation can be performed.

Figure 7:
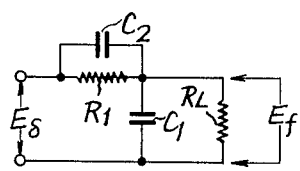
FIGURE 7 is a connection diagram showing another example of the feedback element of this invention.

For instance, the circuit in FIGURE 7 is an example. That is, a capacitor is connected in parallel to the resistor $R_1$ and a capacitor $C_1$ is connected in parallel to the impedance $R_L$ and its transfer function $f(s)$ becomes as follows:

$$f(s) = \frac{R_L}{R_1+R_L} \cdot \frac{R_1 C_2 S+1}{\frac{R_1 R_L}{R_1+R_L}(C_1+C_2)S+1}$$

This is exactly equivalent to that of the circuit shown in FIGURE 6, if $$\frac{R_1 R_L}{R_1+R_L}(C_1+C_2)$$

is selected to a value which is necessary for the D operation and $R_1 C_2$ is selected to a value sufficient to stabilize the loop.

Figure 8:
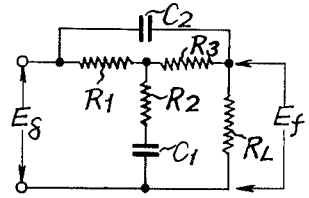
FIGURE 8 is a connection diagram showing a further example of the feedback element of this invention.

A circuit shown in FIGURE 8 can be formed by combining the circuits shown in FIGURES 6 and 7, that is, a resistor $R_3$ is connected in series with the impedance $R_L$; the resistors $R_1$ and $R_3$ are shunted by the capacitor $C_2$ and the resistor $R_3$ and the impedance $R_L$ are shunted with a series circuit composed of the resistor $R_2$ and the capacitor $C_1$ connected in series therewith, and its detailed explanation is omitted for the simplicity since the effects of the circuit can be understood from the foregoing description.

As will be apparent from the above explanation the element 5 is sufficient to possess the following features for attaining the object of this invention:

(1) The element 5 has substantially a first order delay the time constant of which is a rate time necessary for the D operation in the servo system.

(2) The element 5 has a first order lead the time constant of which is necessary for stabilizing the servo loop or it has a higher order lead, thereby stabilizing the servo loop. The explanation will be continued as to the second paragraph of the features. That is, the circuits shown in FIGURES 6 and 7 are equivalent to the circuit of FIGURE 2 for the stable operation of the loop, as has been already explained. It has also been described that the circuit of FIGURE 3 serves to better stabilize the servo loop, due to the lead of the phase of the signal therein, than that of FIGURE 2. A circuit which is equivalent to that of FIGURE 3 for the stable operation of the servo loop should have a higher order lead. Such a circuit will also serve to attain the object of this invention.

Figure 9:
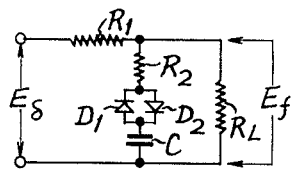
FIGURE 9 is a connection diagram showing a yet further example of the feedback element of this invention.

FIGURE 9 illustrates a circuit in which a non-linear element is connected in series to $R_2$ and C of the circuit in FIGURE 6. As the non-linear element a pair of diodes or a varistor can be used. In this example, semiconductor diodes $D_1$ and $D_2$ are connected in parallel with the opposite polarity to form a parallel circuit which is connected in series to $R_2$ and C in a circuit similar to that of FIGURE 6. The semiconductor diode has a high resistance until the applied positive voltage reaches a certain value, namely about 0.4 v. in a germanium diode and about 0.9 v. in a silicon diode, and hence they substantially show a dead zone characteristic in the circuit of FIGURE 9. With the connection of this non-linear element, when $E\delta$ is lower than the aforesaid certain voltage a current flowing to C is small and the D operation is not effectively performed, and when $E\delta$ is large the PD operation is carried out effectively. By utilizing the a non-linear element a suitable PD operation is performed with respect to a small input and the D operation can be more prompted to a large input. For example, in an example of a marine automatic pilot, it is possible to prompt the D operation in the case of a course change of a large angle to increase the damping of the ship's heading and to reduce the D operation with respect to small deviation from the setting course and also to make the pilot insensitive to waves and other noises.

Figure 10:
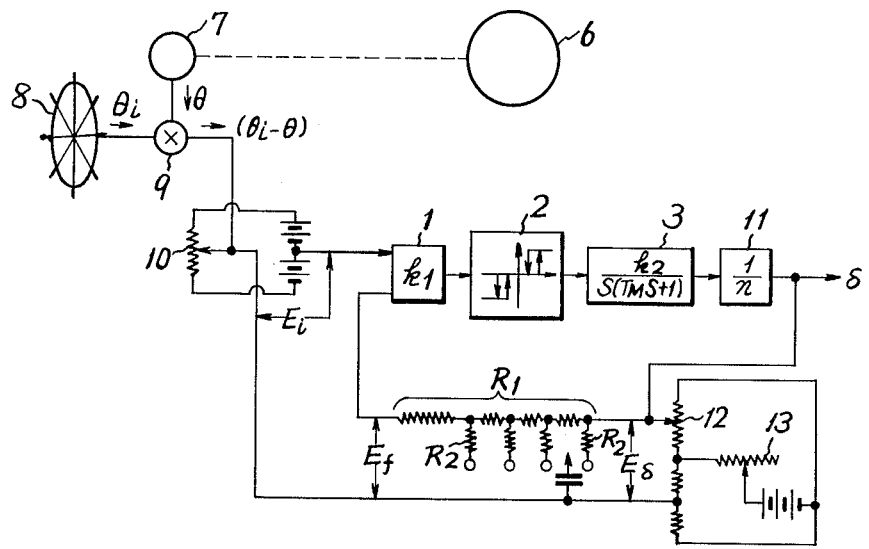
FIGURE 10 is a diagram for illustrating an embodiment of this invention.

FIGURE 10 is an automatic pilot according to this invention. The azimuth $\theta$ of the ship's heading is transmitted from a gyrocompass 6 through a repeater 7 to a differential gear 9. The angle at the output side of the differential gear is the difference between the angle $\theta$ of the repeater 7 and that of a setting course angle $\theta_1$ which is determined by a steering wheel 8. A potentiometer 10 is operated in proportion to $(\theta - \theta_1)$ thereby producing a voltage $E_1$ which is proportional to $(\theta - \theta_1)$. The voltage $E_1$ is compared with a feedback voltage $E_f$ transmitted through the element of this invention and the difference voltage therebetween is amplified by an amplifier 1 and operates a relay 2, producing an order rudder and $\delta$ through a gear train 11 by a servo motor 3 and driving a feedback potentiometer 12 at the same time, whereby a voltage $E\delta$ is produced in proportion to the order rudder angle. $E\delta$ is transmitted to the circuit of FIGURE 10 which is equivalent to that shown in FIGURE 6 but the resistors $R_1$ and $R_2$ are variable and $E_f$ is produced at its output end. In this case, the rate time is changed by adjusting $R_1$ and $R_2$ simultaneously to make $R_2C$ to a suitable value for the stable operation of the servo loop. A circuit such as shown in FIGURE 9 which contains non-linear elements may also be employed in the system of FIGURE 10, in which case the non-linear element is inserted so as to interconnect $R_2$ and C. The gain of the P operation is controlled by adjusting a voltage applied to the potentiometer 12, which voltage is in turn adjusted by a variable resistor 13 shown in the drawing. The above adjustment illustrates the adjustment of $k_3$ in FIGURE 1.

According to this invention as above described, the PD operation can be accomplished even in a relay servo system. Furthermore, this invention has advantages in that the servo system is cheaper in price and more accurate in operation, even if an input signal level is appreciably low, than other servo systems. The PID operation can of course be carried out.

Figure 11:
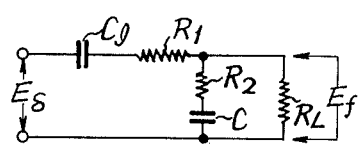
FIGURE 11 is a connection diagram illustrating an embodiment of the feedback element of this invention.

The circuit of FIGURE 11 formed by combining the circuits of FIGURES 3 and 6 is an example of a feedback element suitable so that the PID operation can be effected. It will be apparent that, by combining each of the circuits of FIGURES 7, 8 and 9 with the circuit of FIGURE 3, feedback circuits which are respectively similar to that of FIGURE 11, for effecting the PD operation can be formed, and it will be apparent that all the circuits effect the PID operation stably. If desired, to obtain a servo system which would have the advantages as mentioned previously in connection with FIGURE 9, these circuits may also employ a non-linear element in the parallel leg as shown in FIGURE 9.

In the circuit of FIGURE 11 a capacitor $C_I$ is connected in series to the resistor $R_1$ and a series circuit consisting of the resistor $R_2$ and capacitor C is connected in parallel to the impedance $R_L$, and it follows that $$f(s) = \frac{R_L}{R_t} \cdot \frac{R_2CS+1}{\frac{1}{R_tC_IS}+1+\frac{R_1R_2+R_1R_L+R_2R_L}{R_t}CS}$$

where $$R_t \equiv \left(1+\frac{C}{C_I}\right)R_L + \frac{C}{C_I}R_2 + R_1$$

The general charactristic obtained by this is as follows:

$$\delta = \frac{k_0}{k_3} \cdot \frac{R_t}{R_L} \cdot \frac{\frac{R_1R_2+R_1R_L+R_2R_L}{R_t}CS+1+\frac{1}{R_tC_IS}}{(R_2CS+1)}$$

Namely, the PID operation is performed.

In the foregoing, it has been explained that the servo motor is operated by a relay assembly, but even if it is replaced with all other devices functioning as the relay assembly, for example, amplifiers such as a transistor, a vacuum tube controlled rectifier, controlling discharge tube or the like, or a magnetic amplifier, the objects of this invention can also be attained. Furthermore, this invention may equally be embodied by using a hydraulic or pneumatic servo motor as well as electric servo motor.

It will be apparent that many modifications and variations may be effected without departing from the scope of the novel concept of this invention.

What is claimed is:
1. A non-linear servo system comprising:
  (a) a servo motor;
  (b) relay type controlling means for controlling said servo motor;
  (c) transducer means coupled to the output of said servo motor for producing a feedback electric signal which is proportional to the output of said non-linear servo system;
  (d) electric circuit means coupled to said relay type controlling means to couple an incoming signal to said controlling means, said circuit means including a summing point;
  (e) a feedback circuit interconnecting said transducer means to said electric circuit means, to couple said feedback electric signal to said summing point; and
  (f) a feedback element in said feedback circuit for affording proportional and derivative operations to said non-linear servo system, said feedback element including a non-linear element which causes a de- sirable variation of the derivative operation in accordance with the value of the output signal of said transducer.

2. A non-linear servo system as claimed in claim 1, wherein said feedback element comprises a resistor inserted in series in said feedback circuit and a parallel circuit inserted in said feedback circuit at the output side of said resistor, said parallel circuit including a resistor and a capacitor connected in series therewith, and a non-linear element inserted in said parallel circuit.

3. A non-linear servo system as claimed in claim 1, wherein said feedback element comprises a resistor inserted in series in said feedback circuit and a series circuit inserted in parallel in said feedback circuit at the output side of said resistor, said series circuit including a resistor, a capacitor and a non-linear element connected in series with one another, and said non-linear element comprising two diodes connected in parallel with each other in the opposite polarity.

4. A non-linear servo system as claimed in claim 1, wherein said feedback element comprises a resistor inserted in series in said feedback circuit and a varistor inesrted in said feedback circuit at the output side of said resistor.

5. A non-linear servo system as claimed in claim 1, wherein said feedback element comprises two resistors inserted in series in said feedback circuit, a series circuit inserted in parallel to said feedback circuit at the connection point of said two resistors, said series circuit including a resistor and a capacitor connected in series therewith, another capacitor connected across the outer sides of said first mentioned two resistors, and a non-linear element inserted in said latter series circuit.

6. A non-linear servo system as claimed in claim 1, wherein said feedback element comprises a series circuit of a resistor and a capacitor inserted in said feedback circuit and a series circuit inserted in parallel in said feedback circuit at the output side of said first mentioned series circuit, said second mentioned series circuit including a resistor, a capacitor connected in series therewith, and a non-linear element inserted in said second mentioned series circuit, said non-linear element comprising two diodes connected in parallel with each other in the opposite polarity.

7. A non-linear servo system as claimed in claim 1, wherein said feedback element comprises a series circuit of a resistor and a capacitor inserted in said feedback circuit and a series circuit inserted in parallel in said feedback circuit at the output side of said first-mentioned series circuit, said second mentioned series circuit including a resistor, a capacitor connected in series therewith, and a non-linear element inserted in said second mentioned series circuit, said non-linear element comprising a varistor.

8. A marine automatic pilot for controlling a rudder angle in response to a coarse error signal, said marine automatic pilot comprising:
 (a) a servo motor;
 (b) relay type controlling means for controlling said servo motor;
 (c) transducer means coupled to the output of said servo motor for producing a feedback electric signal which is substantially proportional to said rudder angle;
 (d) electric amplifier means for controlling said relay type controlling means;
 (e) electric circuit means coupled to said amplifier means for producing an input electric signal which is proportional to said coarse error signal, and which is led to said amplifier means, said circuit means including a summing point;
 (f) a feedback circuit interconnecting said transducer means to said electric circuit means to couple said feedback electric signal to said summing point; and
 (g) said feedback circuit comprising an electrical linear element and an electric non-linear element, thereby effecting proportional operation between said coarse error signal angle and rudder angle and a non-linear derivative operation.

References Cited by the Examiner
UNITED STATES PATENTS
2,448,564   9/1948   Wilkerson _____ 318—18
OTHER REFERENCES
Servomechanism Practice by Ahrendt and Savant, chapter 5 "Servo Network" pp.145–176.

JOHN F. COUCH, *Primary Examiner.*